United States Patent [19]

Emmett

[11] Patent Number: 4,928,579
[45] Date of Patent: May 29, 1990

[54] PISTON FOR DISC BRAKES

[75] Inventor: John E. Emmett, Farmington Hills, Mich.

[73] Assignee: Occidental Chemical Corporation, Niagara Falls, N.Y.

[21] Appl. No.: 720,782

[22] Filed: Apr. 8, 1985

Related U.S. Application Data

[63] Continuation-in-part of Ser. No. 293,645, Aug. 17, 1981, abandoned, which is a continuation-in-part of Ser. No. 270,731, Jun. 5, 1981, Pat. No. 4,401,012, which is a continuation-in-part of Ser. No. 202,510, Oct. 31, 1980, abandoned.

[51] Int. Cl.$^5$ ............................................. F16J 1/00
[52] U.S. Cl. ................................... 92/248; 188/73.38
[58] Field of Search .................. 92/248, 249, 254; 188/72.4, 72.5, 73.31, 73.32, 73.36, 73.37, 73.38, 322.22, 264 G, 370; 403/308, 326, 343, 361, 404; 285/DIG. 22

[56] References Cited

U.S. PATENT DOCUMENTS

| | | | |
|---|---|---|---|
| 3,497,038 | 2/1970 | Schrader | 92/248 X |
| 3,612,409 | 10/1971 | Henning | 285/DIG. 22 |
| 3,730,570 | 5/1973 | Brochstein | 403/361 |
| 4,042,072 | 8/1977 | Baba | 188/370 |
| 4,170,926 | 10/1979 | Emmett | 92/248 X |
| 4,186,824 | 2/1980 | Preston | 188/73.38 |
| 4,203,354 | 5/1980 | Cunningham | 92/248 X |

FOREIGN PATENT DOCUMENTS

| | | | |
|---|---|---|---|
| 1264794 | 5/1961 | France | 188/72.5 |
| 819222 | 9/1959 | United Kingdom | 188/370 |

OTHER PUBLICATIONS

New Pin Slider Disc Brake Designs for Compact U.S. Cars of the 80's; SAE Technical Paper Series; No. 810,314; D. Bieraeugel and K. Stoerzel; Feb. 23, 1981, copy supplied by applicant in parent application No. 06/293,645.

*Primary Examiner*—Robert G. Nilson
*Attorney, Agent, or Firm*—James F. Tao; James F. Mudd

[57] ABSTRACT

An improved disc brake plastic piston is described which has a metallic cap or face which provides a means of attaching a brake shoe or a brake shoe assembly, or provides a dust boot groove, or, in a most preferred mode, the metallic cap component provides both a brake shoe retaining means and a dust boot groove. The piston is comprised of a cylindrical plastic body having an open end and a closed end. At least one ring bead can extend from the wall of the piston body contiguous to, or near, the open end. A metallic cap extends over the end wall of the open end of the cylindrical body and is secured to the body by being snap fit or clamped over the ring bead. Alternative means for anchoring the metallic cap are provided, such as by crimping the interior lip of the metallic cap or by providing threads on the internal or external walls of the piston adjacent to the open end of the piston, and corresponding or matching threads on the metallic cap.

20 Claims, 5 Drawing Sheets

# PISTON FOR DISC BRAKES

REFERENCE TO PRIOR APPLICATION

This is a continuation-in-part of copending application Ser. No. 293,645, filed Aug. 17, 1981, now abandoned, which is a continuation-in-part of copending application Ser. No. 270,731, filed June 5, 1981, now U.S. Pat. No. 4,401,012, which is a continuation-in-part of copending application Ser. No. 202,510, filed Oct. 31, 1980, now abandoned.

BACKGROUND OF THE INVENTION

The present invention relates to an improved piston for disc brakes, such as vehicular disc brakes. More in particular, the present invention relates to an improved plastic brake piston having a metallic cap positioned on the face of the piston which is adapted to engage the brake shoe or brake shoe attaching means, such as a clip. The cap provides a protective cover for the plastic piston face nearest the braking means and also provides a means for retaining the brake shoe or brake shoe clip, and may also provide a means for retaining a dust boot. Also, the metallic cap can provide a means for shielding the dust boot from the adverse affects of heat.

Although the present invention will be described in terms of disc brakes, particularly intended for motor vehicles, it will be understood that the present improved piston is equally adaptable to piston brakes utilized on railroad vehicles and industrial applications such as engines.

One type of brake assembly presently in use in motor vehicle disc brakes is the opposed piston type. In such type, a piston is positioned adjacent each opposite side of a brake disc and forces its respective brake shoe or lining against the disc to impart a braking action. Other types of brake assemblies to which the present invention is equally useful are those in which a single piston is utilized to move the brake shoe or lining into contact with both sides of the brake disc by utilizing a caliper slide to impart a braking action.

Upon the advent of the use of disc brakes in motor vehicles, the pistons used were metallic, usually fabricated of chrome plated steel, and required several time consuming and costly machining operations. More recently, pistons for disc brakes have been fabricated of a plastic material, usually a phenolic resin molding compound. Such pistons may be produced by molding techniques known in the art. Typical plastic pistons are described in U.S. Pat. No. 4,170,926, the disclosure of which is hereby incorporated herein by reference. Plastic pistons can be molded with at least one ring bead on the force portion of the mold to create an undercut to assist in withdrawing the piston from the mold when the mold is opened. Up to the present time, such ejector beads have been positioned on the piston to be inconspicuous and non-interfering with the piston operation. It has now been found that the ejector bead may be utilized to provide an improved brake piston.

More recent designs of plastic pistons embody a hollowed cylinder having an internal groove for retaining a brake shoe clip. The groove, by necessity, has to be formed after the molding operation and requires a machining step. Such pistons may also require a groove, typically on the outside wall, to retain a dust boot or cover. The forming of a dust boot groove in the piston also requires machining after molding, which, in turn, adds a further machining step. It has now been found that the ejector bead or beads previously thought a useless necessity can be utilized to eliminate one or more machining steps. In situations where the ejector bead is not used or desired, alternative anchoring means can be provided.

DISCLOSURE OF THE INVENTION

The improved disc brake plastic piston of the present invention has a metallic cap or face which provides a means of attaching a brake shoe or a brake shoe assembly, or provides a dust boot groove, or, in a most preferred mode, the metallic cap component provides both a brake shoe retaining means and a dust boot groove. Any of the metallic caps of the invention can be provided with means for shielding the dust boot from heat.

The present piston is comprised of a cylindrical plastic body having an open end and a closed end. The "closed end" can be cored out for structural and other purposes and is deemed to be within the foregoing description. In one embodiment at least one ring bead extends from the wall of the piston body contiguous to, or near, the open end. The bead or beads are suitably ejector beads utilized at the end of the molding operation to remove the part from the mold. A metallic cap extends over the end wall of the open end of the cylindrical body and is secured to the body by being snap fit or clamped over the ring bead. The cap is adapted to receive and hold a brake shoe clip, or provide a dust boot groove, and, in a most preferred embodiment, provides both a brake shoe retaining means and a dust boot groove. Thus the metallic caps of the invention have means for attaching a vehicular brake shoe or brake shoe assembly so that the brake shoe moves in unison with the piston during braking and debraking of the vehicle. The above described attachment is not a permanent bond such as created by welding or soldering. Rather the brake shoe clip engages the cap as a result of the shaped surface thereof, and is readily removable when it is desired to disassemble the piston from the braking mechanism.

While the invention has been described with respect to use of the ring beads on the external and internal walls of the piston, other embodiments omit the use of such ring beads. Alternative means for anchoring or attaching the metallic cap to the piston where no ring beads are provided at the point of attachment, include modifying the normally regular edge surface of the interior. Such modifications include crimping, notching or lancing the metallic edge in one or more places, or serrating all or portions of the metallic edge. Another alternative involves the use of threads molded into the inside wall or the outside wall of the piston adjacent the open end of the piston, and corresponding threads formed in the metallic cap.

All of the foregoing embodiments of the invention can be further modified to provide a metallic extension which serves as a heat shield for the dust boot. In normal practice, dust boots are subject to heat generated during operation of the disc brakes. Ordinarily, there is no means for protecting the dust boot and deterioration occurs. The metallic cap provides a way to provide a heat shield. The metallic cap is extended outwardly over the dust boot to shield the boot from the adverse affects of heat. The heat shield can take various physical forms as will be illustrated hereinafter.

The metallic cap can be coated with a plastic or other surface to provide a barrier to heat and sound. Such a coating is particularly advantageous on the surface which contacts or faces the disc backing plate. A suitable coating for this purpose is a Buna-N rubber coating.

The present composite piston eliminates machining to form a groove in the piston to provide a means of retaining the brake shoe or the dust boot. Accordingly, the present piston can be fabricated with a thinner wall section than the plastic pistons of the prior art. In addition, the present composite piston provides a sound barrier layer enabling a quieter operation of the vehicle brakes. The metal face also reduces scuffing of the surface against the brake shoe backing plate, and distortion of the piston due to high compressive load at elevated temperature. The metal face provides an improved means of dissipating heat. The metallic cap further protects the edges of the piston against chipping and other damage, and provides a prying surface to be utilized during brake repair.

BRIEF DESCRIPTION OF THE DRAWINGS

FIG. 1 shows a metallic cap secured to a piston by a snap fit over a ring bead extending from the inner wall of the piston, and adapted to receive and hold a brake shoe clip.

FIG. 2 depicts a metallic cap secured to a piston by a ring bead in the narrowed portion of the outer wall of the piston, and adapted to receive a dust boot.

FIG. 3 illustrates a metallic cap secured to a piston by a snap fit over ring beads on the inner and outer walls of the piston, and adapted to receive and hold a brake shoe clip and a dust boot.

FIG. 4 shows a metallic cap secured to a piston by crimps in the inner edge of the metallic cap which engages the piston body, and adapted to receive and hold a brake shoe clip.

FIG. 5 depicts a metallic cap secured to a piston by the crimps in the inner edge of the metallic cap which engages the piston body, and adapted to receive and hold a brake shoe clip and a dust boot.

FIG. 6 illustrates a metallic cap secured to a piston by notches in the inner edge of the metallic cap which engages the piston body, and adapted to receive and hold a brake shoe clip and a dust boot.

FIG. 7 shows a metallic cap secured to a piston by serrations in the inner edge of the metallic cap which engages the piston body, and adapted to receive and hold a brake shoe clip and a dust boot, and provided with a heat shield to protect the dust boot.

FIG. 8 depicts a metallic cap secured to a piston by a bead on the outer wall in the narrow portion, adapted to receive a dust boot, and provided with a heat shield to protect the dust boot.

FIG. 9 illustrates a metallic cap secured to a piston by crimps in the inner edge of the metallic cap which engages the piston body, and a bead on the outer wall on the piston, and adapted to receive and hold a brake shoe clip and dust boot, and provided with a heat shield to protect the dust boot.

FIG. 10 shows a metallic cap secured to a piston by threads extending from the external wall of the piston and adapted to receive and hold a brake shoe clip and a dust boot.

FIG. 11 depicts a metallic cap secured to a piston by threads extending from the inner wall from the piston and adapted to receive and hold a brake shoe clip and dust boot.

FIG. 12 illustrates a metallic cap secured to a piston by ring beads on the inner and outer wall surfaces of the piston, and adapted to receive and hold a brake shoe clip and dust boot.

FIG. 13 shows a metallic cap secured to a piston by crimps inner edge of the metallic cap which engages the piston body, and adapted to receive and hold a brake shoe clip and dust boot.

FIG. 14 depicts a metallic cap secured to a piston by threads on the inner wall of the piston, and adapted to receive and hold a brake shoe clip and a dust boot and provided with a heat shield for the dust boot.

BEST MODES FOR CARRYING OUT THE INVENTION

Figure 1:
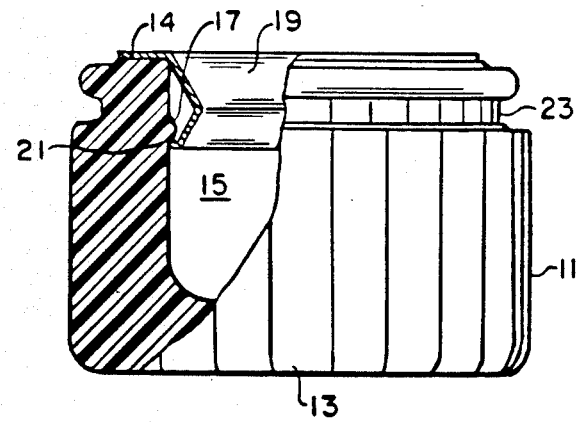
FIGS. 1 through 14 are elevational views of the present composite piston, partly in section, to illustrate various preferred embodiments of the invention.

Looking now at FIG. 1, cylindrical piston 11 has a closed end 13 and an open end 15. Ring bead 17 extends from the internal wall of piston 11. Metallic cap 19, preferably of steel, extends over and covers end wall 14 or open end 15 of piston 11 and is secured on piston 11 by being snap fit or clamped over bead 17 along shaped portion 21. Cap 19 is adapted to receive a typical brake shoe clip, not shown, by receiving the brake shoe clip therein and securing the brake shoe clip by being snap fit. In this embodiment, a groove 23 would be required to be machined to provide a means of retaining a dust boot.

Figure 2:
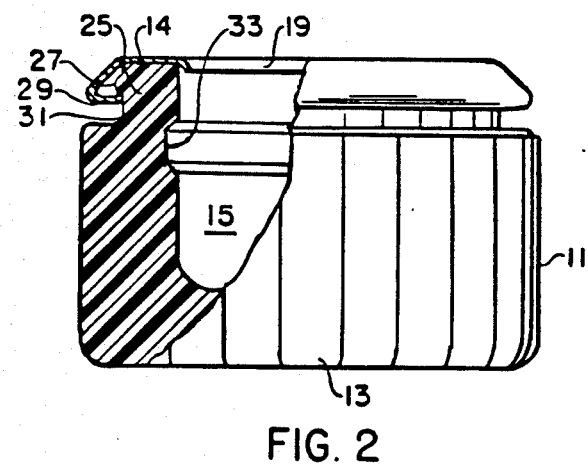

FIG. 2 illustrates an embodiment of the invention wherein piston 11 has a narrow portion 25 contiguous to open end 15. A ring bead 27 is positioned in or along narrowed portion 25. Metallic cap 19 in this embodiment extends over and covers end wall 14 of piston 11 and is snap fit or clamped over bead 27 along shaped portion 29 and provides groove 31 adapted to receive and hold a typical dust boot, not shown. In this embodiment, groove 33 may be required to be machined to provide a means of retaining a brake shoe clip.

Figure 3:
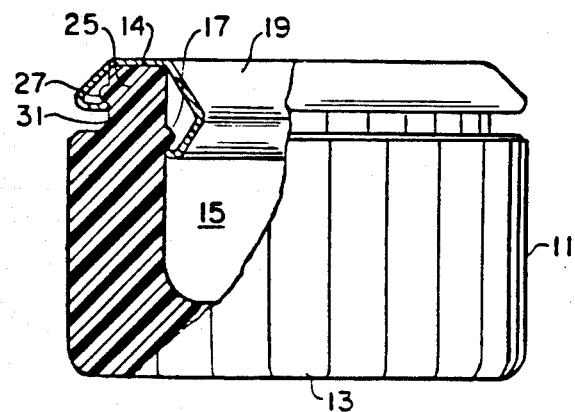

Looking now at FIG. 3, piston 11 has a narrowed portion 25 and internal ring bead 17 and external ring bead 27. Metallic cap 19 extends over and covers end wall 14 of open end 15 and is snap fit or clamped over both bead 17 and bead 27. As shown in FIG. 3, two ring beads, 17 and 27, are utilized; however, it will be understood that a single bead, either internal or external, may be used to secure the cap member 19 to the piston member 11. Cap 19 provides a means of retaining a typical brake shoe clip entering open end 15 and also by means of shaped portion 29 provides a groove 31 for retaining a typical dust boot.

Figure 12:
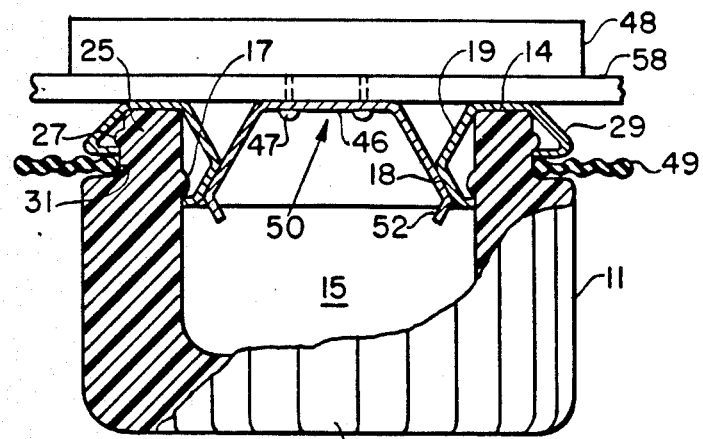

FIG. 12 shows the relationship of the piston of FIG. 3 to a brake shoe clip 50 and a dust boot 49. Brake shoe clip 50 has two or more bent prongs 52 which enter and engage the inner wall 18 of cap 19. The bent prongs 52 are joined to a base plate 46 which is attached by bolts or rivets 47 to a brake shoe backing plate 58 to which is attached brake shoe 48. In operation, the face of the backing plate 58 touches the portion of metallic cap 19 which covers end wall 14, but it is through the prongs 52 that the brake shoe clip 50 is attached to piston 11 by means of the inner wall 18 formed in the metallic cap 19. Dust boot 49 is shown engaged in groove 31. The manner of attachment of the brake shoe clip and dust boot shown in FIG. 12 illustrates the manner of attachment contemplated with respect to previously described FIGS. 1 and 2.

Figure 4:
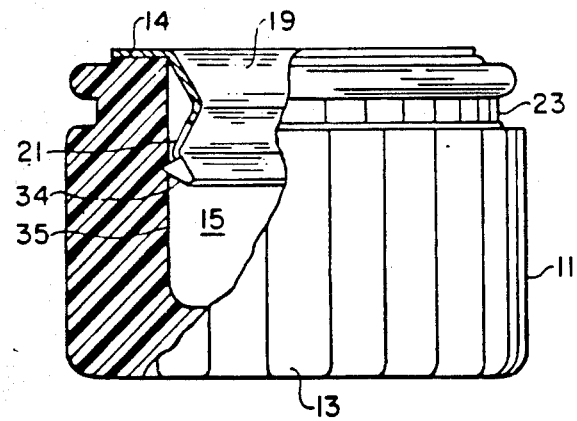

In the embodiment shown in FIG. 4, cylindrical piston 11 has a closed end 13 and an open end 15. Metallic cap 19, preferably of steel, extends over and covers end wall 14 or open end 15 of piston 11 and is secured on piston 11 by one or more crimps 34 along shaped portion 21. The crimps embed into the inside wall 35 of the piston to hold metallic cap 19 in place on piston 11. Cap 19 is adapted to receive a typical brake shoe clip, not shown, by receiving the brake shoe clip therein and securing the brake shoe clip by being snap fit. In this embodiment, a groove 23 would be required to be machined to provide a means of retaining a dust boot.

Figure 5:
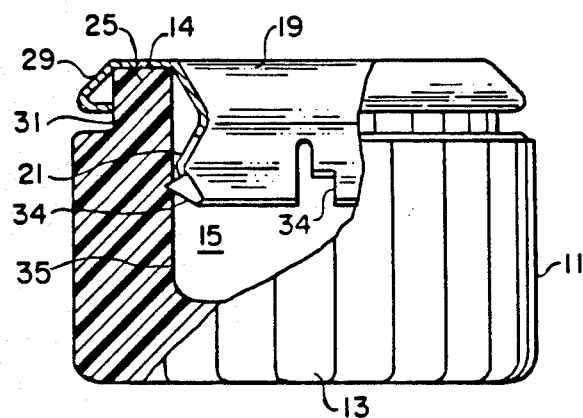

FIG. 5 illustrates an embodiment wherein piston 11 has a narrowed portion 25. Metallic cap 19 extends over and covers end wall 14 of open end 15 and is secured on piston 11 by one or more crimps 34 along shaped portion 21. The crimps embed into the inside wall 35 of the piston to hold metallic cap 19 in place on piston 11. As shown in FIG. 5, no ring beads are utilized; however, it will be understood that an external bead can be used to further secure the cap member 19 to the piston member 11. Cap 19 provides a means for retaining a typical brake shoe clip entering open end 15, and also by means of shaped portion 29 provides a groove 31 for retaining a typical dust boot.

Figure 13:
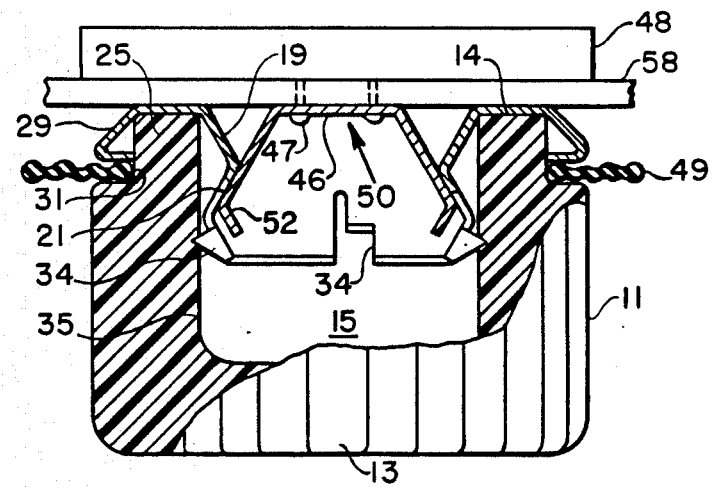

FIG. 13 shows the relationship of the piston of FIG. 5 in a brake shoe clip 50 and a dust boot 49. Brake shoe clip has two or more bent prongs 52 which enter and engage the inner shaped portion 21 of cap 19. The bent prongs 52 are joined to a base plate 46 which is attached by bolts or rivets 47 to a brake shoe backing plate 58 to which is attached brake shoe 48. In operation, the face of the backing plate 58 touches the portion of metallic cap 19 which covers end wall 14, but it is through the prongs 52 that the brake shoe clip 50 is attached to piston 11 by means of shaped portion 21 formed in the metallic cap 19. Dust boot 49 is shown engaged in groove 31. The manner of attachment of the brake shoe clip and dust boot shown in FIG. 13 illustrates the manner of attachment contemplated with respect to FIGS. 4, 6, 7, 9 and 10.

Figure 6:
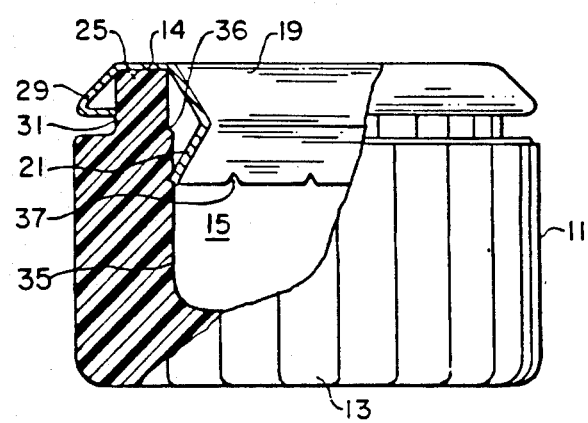

In the embodiment shown in FIG. 6, piston 11 has a narrowed portion 25 and the inside wall is provided with ramp 36 such that the diameter of the inside wall 34 is narrower near closed end 13 than at the end wall 14. Metallic cap 19 extends over and covers end wall 14 of open end 15 and is secured on piston 11 by one or more notches 37 along shaped portion 21. The notches embed into the inside wall 35 of the piston to hold metallic cap 19 in place on piston 11. As shown in FIG. 6, no ring beads are utilized; however, it will be understood that an external bead can be used to secure the cap member 19 to the piston member 11. Cap 19 provides a means of retaining a typical brake shoe clip entering open end 15 and also by means of shaped portion 29 provides a groove 31 for retaining a typical dust boot.

Figure 7:
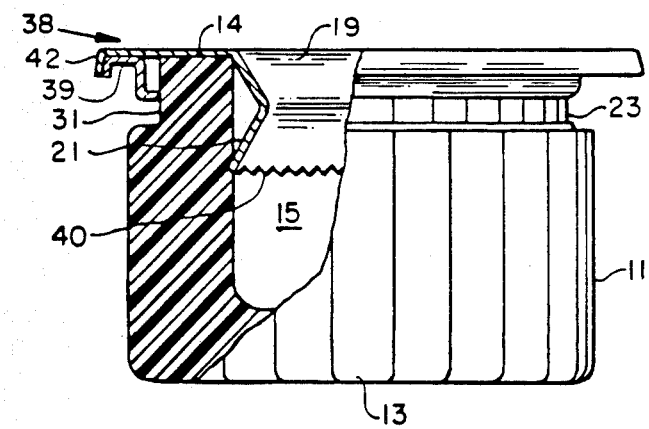

In the embodiment shown in FIG. 7, cylindrical piston 11 has a closed end 13, an open end 15, and a narrowed portion 25, contiguous with open end 15. Metallic cap 19, preferably of steel, extends over and covers end wall 14 of open end 15 of piston 11 and is secured on piston 11 by serrations 40 along shaped portion 21. The serrations embed into the inside wall 35 to hold cap 19 in place on piston 11. Cap 19 is adapted to receive a typical brake shoe clip, not shown, by receiving the brake shoe clip therein and securing the brake shoe clip by being snap fit. In this embodiment, a heat shield 38 is provided by extending the metallic cap 19 outwardly from end wall 14 such that the heat shield partially covers a typical dust boot (not shown). Additionally, element 39 is formed and pressed into edge 42 of cap 19 to provide groove 31 which is adapted to receive and hold the typical dust boot. Alternatively, element 39 can be welded to cap 19.

Figure 8:
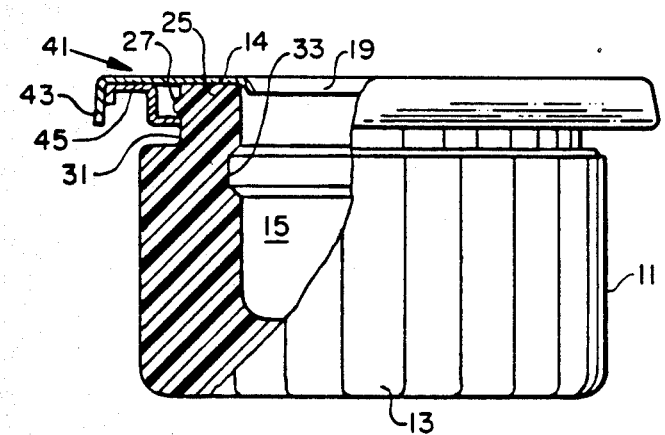

FIG. 8 illustrates an embodiment of the invention wherein piston 11 has a narrow portion 25 contiguous to open end 15. A ring bead 27 is positioned in or along narrowed portion 25. Metallic cap 19 in this embodiment extends over and covers end wall 14 of piston 11 and extends outwardly from end wall 14 to form heat shield 41 which partially covers a typical dust boot (not shown). Heat shield element 43 provides further heat protection to the dust boot. In addition to this, element 45 is formed and pressed into cap 19 and is snap fit or clamped over bead 27 to provide groove 31 adapted to receive and hold the typical dust boot. In this embodiment, groove 33 may be required to be machined to provide a means of retaining a brake shoe clip.

Figure 9:
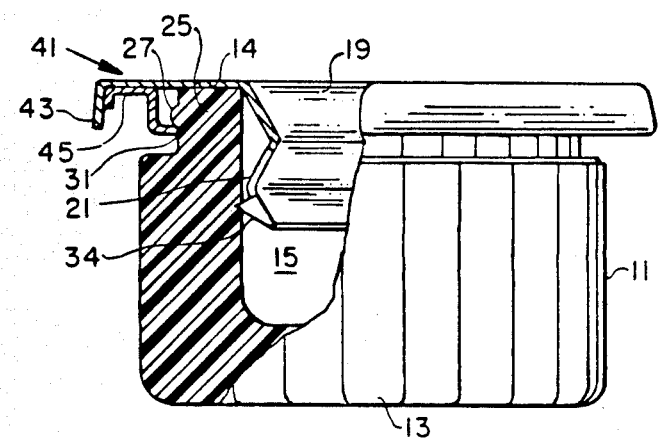

In FIG. 9, piston 11 has a narrowed portion 25 and external ring bead 27. Metallic cap 19 extends over and covers end wall 14 of open end 15 and is secured to piston 11 by being snap fit or clamped over bead 17 and by means of one or more crimps 34 along shaped portion 21. The crimps embed into the inside wall 35 of the piston to hold metallic cap 19 in place on piston 11 As shown in FIG. 9, one ring bead 17 is utilized; however, it will be understood that only the crimp members 34 may be used to secure the cap member 19 to the piston member 11. Cap 19 provides a means of retaining a typical brake shoe clip entering open end 15 and also provides a groove 31 for retaining a typical dust boot. Cap 19 extends outwardly from end wall 14 to form heat shield 41 which is adapted to partially cover a typical dust boot (not shown). Heat shield element 43 provides additional heat protection to the dust boot. Element 45 is formed to press fit into cap 19 and is snap fit or clamped over bead 27 to provide groove 31 adapted to receive and hold the dust boot.

In a further embodiment of the invention, the metallic cap is anchored to the plastic piston by means of a thread or formed on the inside wall or the outside wall of the plastic piston adjacent to the open end of the piston, and corresponding thread or threads formed in the portion of the metallic cap which fits the open end of the plastic piston. A single thread around the outer circumference of the piston, or within the inner circumference of the open end of the piston, suffices to hold the metal cap in place. However, more than one such thread can be employed if desired in both the open end of the plastic piston as well as in the corresponding portion of the metallic cap. The plastic threads can readily be formed during the molding of the plastic piston. In this embodiment of the invention, the metallic cap can fit snugly against the inner wall and have corresponding grooves to match the plastic thread. Alternately, the metallic cap can fit snugly to the outside wall of the plastic piston and have threads that correspond to the plastic threads formed on the outside wall of the piston. These threaded embodiments of the invention can be further modified with a bayonet lock mechanism.

Figure 10:
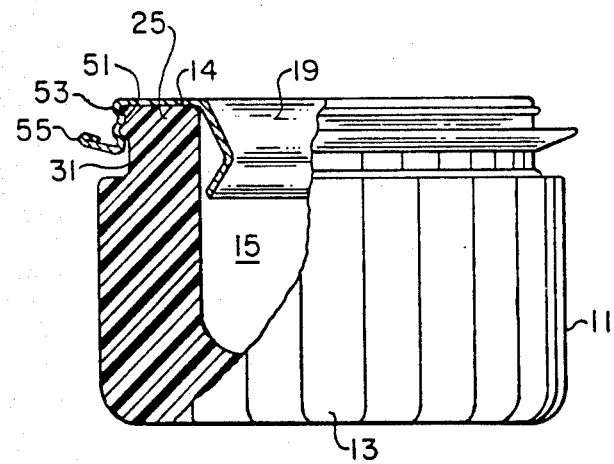
Figure 11:
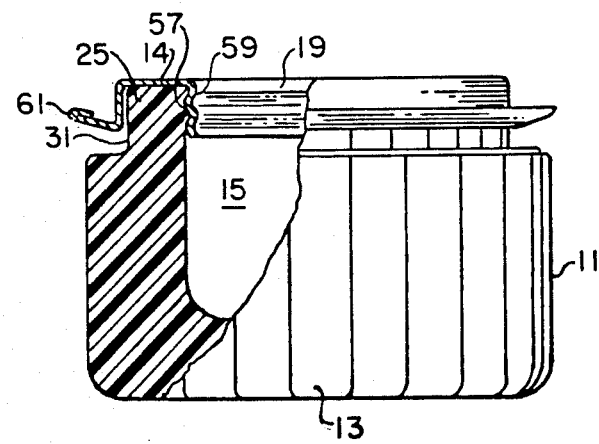

The just described embodiments of the invention are shown in FIGS. 10 and 11.

In FIG. 10, cylindrical piston 11 has a closed end 13 and an open end 15. Threaded portion 51 extends from the external wall of piston 11 at a narrowed portion 25 of the wall adjacent to the open end 15. Metallic cap 19, preferably of steel, extends over and covers end wall 14 of open end 15 of piston 11 and is secured on piston 11 by a threaded portion 53 that fits the plastic threaded portion 51 of the external piston wall. Cap 19 is adapted to receive a typical brake shoe clip, not shown, by receiving the brake shoe clip therein and securing the brake shoe clip by being snap fit. In this embodiment, the outer periphery of cap 19 is provided with a lip extension 55 which forms groove 31 adapted to receive and hold a typical dust boot, not shown.

FIG. 11 illustrates an embodiment of the invention wherein piston 11 has a narrow portion 25 contiguous to open end 15. Threaded portion 57 extends from the internal wall of piston 11 in narrowed wall portion 25. Metallic cap 19 in this embodiment extends over and covers end wall 14 of piston 11 and is attached to piston 11 by a threaded portion 59, which fits the plastic threaded portion 57. The external edge of cap 19 extends over the narrowed wall portion 25 and terminates in lip extension 61, which provides groove 31 adapted to receive and hold a typical dust boot.

Figure 14:
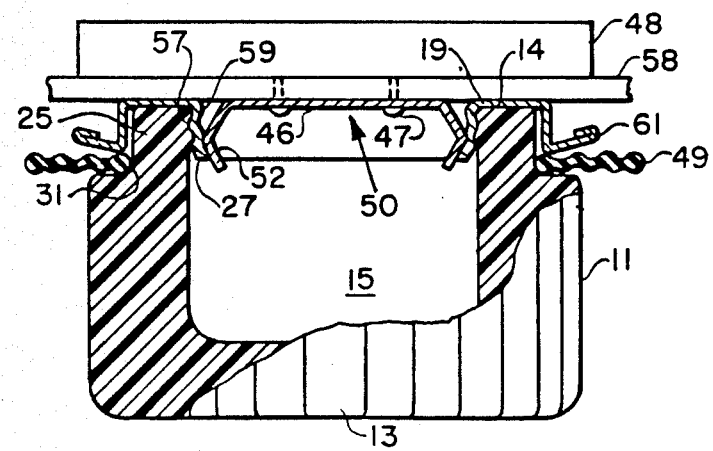

FIG. 14 shows the relationship of the piston of FIG. 11 to a brake shoe clip 50 and a dust boot 49. Brake shoe clip 50 has two or more bent prongs 52 which enter and engage the inner threaded portion 59 of cap 19. The bent prongs 52 are joined to a base plate 46 which is attached by bolts or rivets 47 to a brake shoe backing plate 58 to which is attached brake shoe 48. In operation, the face of the backing plate 58 touches the portion of metallic cap 19 which covers end wall 14, but it is through the prongs 52 that the brake shoe clip 50 is attached to piston 11 by means of threaded portion 59 formed in the metallic cap 19. Dust boot 49 is shown engaged in groove 31.

The foregoing description and embodiments are intended to illustrate the invention without limiting it thereby. It will be understood that various modifications can be made in the invention without departing from the spirit or scope thereof.

What is claimed:

1. A composite vehicular brake piston for activating a vehicular brake shoe during braking of a vehicle comprised of a cylindrical resin body having an open end and a closed end and a metallic cap extending over the end wall of said open end and secured to said body by an anchoring means positioned within the open end of said body, wherein said metallic cap has means for engaging a vehicular brake shoe or brake shoe assembly so that the brake shoe moves in unison with the piston during braking and debraking of the vehicle.

2. The piston of claim 1 wherein said anchoring means is a crimp, notch or serration in the inner edge of said metallic cap which engages the piston body.

3. The piston of claim 2 wherein the metallic cap has means for shielding a dust boot from heat generated by the operation of a disc brake.

4. The piston of claim 1 wherein said anchoring means is a bead extending from the body wall within the open end of the piston body.

5. The piston of claim 1 wherein the piston body has at least one thread extending from said body wall and positioned on a narrowed portion of said wall contiguous to said open end, wherein the end of said cap and the portion of said body adjacent said narrowed portion provide a groove adapted to receive a dust boot.

6. The piston of claim 2 wherein the metallic cap has means for shielding a dust boot from heat generated by the operation of a disc brake, wherein said end of said cap also serves as the support of the heat shielding means.

7. The piston of claim 5 wherein the threaded portion is located on the inside body wall.

8. The piston of claim 5 wherein the threaded portion is located on the outside body wall.

9. The piston of claim 1 wherein the metallic cap has means for shielding a dust boot from heat generated by the operation of a disc brake.

10. A composite vehicular brake piston for activating a vehicular brake shoe during braking of a vehicle comprised of a cylindrical resin body having an open end and a closed end, at least one bead extending from the end wall of said body contiguous to said open end, a metallic cap extending over the end wall of said open end and secured to said body by a snap fit over said bead, wherein said bead is positioned within the open end of said body and said metallic cap has means for engaging a vehicular brake shoe or brake shoe assembly so that the brake shoe moves in unison with the piston during braking and debraking of the vehicle.

11. A composite vehicular brake piston for activating a vehicular brake shoe during braking of a vehicle comprised of a cylindrical resin body having an open end and a closed end, at least one thread extending from the wall of said body contiguous to said open end, a metallic cap extending over the end wall of said open end and secured to said body by at least one thread that corresponds with the threaded portion of said resin body, wherein said thread extending from the body wall is positioned within the open end of said body and said metallic cap has means for engaging a vehicular brake shoe or brake shoe assembly so that the brake shoe moves in unison with the piston during braking and debraking of the vehicle.

12. A composite vehicular brake piston for activating a vehicular brake shoe during braking of a vehicle comprised of a cylindrical resin body having an open end and a closed end, at least one thread extending from the wall of said body contiguous to said open end, a metallic cap extending over the end wall of said open end and secured to said body by at least one thread that corresponds with the threaded portion of said resin body, wherein said body said body has at least one thread extending from said body wall and positioned on a narrowed portion of said wall contiguous to said open end, wherein said cap has means for engaging a vehicular brake shoe or brake shoe assembly so that the brake shoe moves in unison with the piston during braking and debraking of the vehicle, and wherein the end of said cap and the portion of said body adjacent said narrowed portion provides a groove adapted to receive a dust boot.

13. The piston of claim 12 wherein the threaded portion is located on the inside body wall.

14. The piston of claim 12 wherein the threaded portion is located on the outside body wall.

15. The piston of claim 12 wherein the metallic cap has means for shielding a dust boot from heat generated by the operation of a disc brake, wherein said end of said cap also serves as the support of the heat shielding means.

16. Apparatus comprising:
   (1) a composite vehicular brake piston for activating a vehicular brake shoe during braking of a vehicle comprised of a cylindrical resin body having an open end and a closed end, and a metallic cap extending over the end wall of said open end and secured to said body by an anchoring means positioned within the open end of said body, wherein said metallic cap has means for attaching a vehicular brake shoe or brake shoe assembly so that the brake shoe moves in unison with the piston during braking and debraking of the vehicle, and (2) a vehicular brake shoe or brake shoe assembly attached to said means for attaching.

17. The apparatus of claim 16 wherein said metallic cap is joined to said brake shoe or said brake shoe assembly by a brake shoe clip.

18. Apparatus comprising:

(1) a composite vehicular brake piston for activating a vehicular brake shoe during braking of a vehicle comprised of a cylindrical resin body having an open end and a closed end, at least one bead extending from the end wall of said body contiguous to said open end wherein the said bead is positioned within the open end of said body, a metallic cap extending over the end wall of said open end and secured to said body by a snap fit over said bead, wherein said metallic cap has means for attaching a vehicular brake shoe or brake shoe assembly so that the brake shoe moves in unison with the piston during braking and debraking of the vehicle, and (2) a vehicular brake shoe or brake shoe assembly attached to said means for attaching.

19. The apparatus of claim 18 wherein said metallic cap is joined to said brake shoe or said brake shoe assembly by a brake shoe clip.

20. A composite vehicular brake piston for activating a vehicular brake shoe during braking of a vehicle comprised of a cylindrical resin body having an open end and a closed end, wherein said body has an internal bead and an external bead extending from said body wall, said external bead positioned on a narrowed portion of said wall contiguous to said open end, a metallic cap extending over the end wall of said open end and secured to said body by a snap fit over both of said beads, wherein said cap has means for attaching a vehicular brake shoe or brake shoe assembly so that the brake shoe moves in unison with the piston during braking and debraking of the vehicle, and the end of said cap and the portion of said body adjacent said narrowed portion providing a groove adapted to receive a dust boot.

* * * * *